United States Patent
Qin et al.

(10) Patent No.: US 12,483,496 B2
(45) Date of Patent: Nov. 25, 2025

(54) LOOP DETECTION METHOD AND APPARATUS

(71) Applicant: HUAWEI TECHNOLOGIES CO., LTD., Shenzhen (CN)

(72) Inventors: Jianhong Qin, Dongguan (CN); Liang Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/614,303

(22) Filed: Mar. 22, 2024

(65) Prior Publication Data

US 2024/0235986 A1 Jul. 11, 2024

Related U.S. Application Data

(63) Continuation of application No. PCT/CN2022/118349, filed on Sep. 13, 2022.

(30) Foreign Application Priority Data

Sep. 26, 2021 (CN) .......................... 202111130398.7

(51) Int. Cl.
*H04L 45/18* (2022.01)
*H04L 45/00* (2022.01)
(Continued)

(52) U.S. Cl.
CPC .............. *H04L 45/18* (2013.01); *H04L 45/22* (2013.01); *H04L 45/34* (2013.01); *H04L 45/50* (2013.01); *H04L 45/741* (2013.01)

(58) Field of Classification Search
CPC ......... H04L 45/18; H04L 45/22; H04L 45/34; H04L 45/50; H04L 45/741
See application file for complete search history.

(56) References Cited

U.S. PATENT DOCUMENTS

| 2021/0119906 A1 | 4/2021 | Hu et al. | |
| 2021/0211372 A1* | 7/2021 | Lin | ........................ H04L 45/28 |
| 2022/0070084 A1* | 3/2022 | Parakala | ............. H04L 41/0668 |

FOREIGN PATENT DOCUMENTS

| CA | 3108103 A1 * | 2/2020 | ......... H04L 12/4641 |
| CN | 113055295 A | 6/2021 | |
| WO | WO-2021109997 A1 * | 6/2021 | ............. H04L 45/28 |

OTHER PUBLICATIONS

Filsfils, C., et al., "SRv6 Network Programming," draft-filsfils-spring-programming-04, Mar. 4, 2018 (Year: 2018).*

(Continued)

*Primary Examiner* — Caroline H Jahnige
(74) *Attorney, Agent, or Firm* — Leydig, Voit & Mayer, Ltd.

(57) ABSTRACT

A loop detection method and apparatus are provided. The method includes: A first node receives a packet from a second node through a first interface. A node segment identifier is encapsulated at an outer layer of the packet. The node segment identifier identifies a destination node. The first node determines, based on the node segment identifier, that an outbound interface for forwarding the packet is the first interface. The first node determines that a loop exists in a forwarding path of the packet. Whether the loop exists in the forwarding path of the packet is determined by determining whether an interface through which the first node receives the packet is consistent with an outbound interface through which the first node forwards the packet, to further adjust the forwarding path of the packet when the loop exists in the forwarding path of the packet, for example, forward the packet along a backup path or discard the packet, to avoid problems such as port congestion and service packet loss.

12 Claims, 7 Drawing Sheets

(51) Int. Cl.
*H04L 45/50* (2022.01)
*H04L 45/741* (2022.01)

(56) References Cited

OTHER PUBLICATIONS

Filsfils, C., et al., "Segment Routing Architecture," IETF RFC 8402, Jul. 2018 (Year: 2018).*

* cited by examiner

LOOP DETECTION METHOD AND APPARATUS

CROSS-REFERENCE TO RELATED APPLICATIONS

This application is a continuation of International Application No. PCT/CN2022/118349, filed on Sep. 13, 2022, which claims priority to Chinese Patent Application No. 202111130398.7, filed on Sep. 26, 2021. The disclosures of the aforementioned applications are hereby incorporated by reference in their entireties.

TECHNICAL FIELD

This application relates to the communications field of, and more specifically, to a loop detection method and apparatus.

BACKGROUND

Segment routing (SR) is a technology for forwarding packets. The SR divides a network into one or more segments and arranges the segments and network nodes in the network in sequence to obtain a forwarding path. This is essentially similar to source routing.

The SR is classified into segment routing-traffic engineering (SR-TE) and segment routing-best effort (SR-BE). In the SR-BE technology, according to an interior gateway protocol (IGP), an optimal label switched path (LSP), which may also be referred to as a primary path, is calculated by using a shortest path first (SPF) algorithm. In addition, according to the IGP, a topology-independent loop-free alternate (TI-LFA) path, which may also be referred to a backup path and can provide link and node protection for the SR-BE may also be calculated and generated. When a link or node fails, traffic is quickly switched to the backup path, and packets are forwarded through the backup path. In normal cases, the packets are forwarded along the primary path.

When a link fails or recovers, convergence is triggered on each network node. As a result, each network node recalculates the LSP. Due to performance differences between the network nodes, the LSPs are delivered to a forwarding plane at different time after being generated. Consequently, a temporary loop occurs. The loop may affect service transmission, for example, cause service packet loss and port congestion, and further affect other services with a same priority.

Therefore, it is important to determine whether a loop exists between the network nodes.

SUMMARY

This application provides a loop detection method and apparatus, to determine, by determining whether an interface for receiving a packet is consistent with an outbound interface for forwarding the packet, whether a loop exists between nodes, to adjust a forwarding operation on the packet in a timely manner when the loop exists, to avoid problems such as port congestion and service packet loss.

According to a first aspect, this application provides a loop detection method. The method may be performed by a first node, or may be performed by a component (such as a chip or a chip system) configured in the first node. This is not limited in this application.

For example, the method includes: The first node receives a packet from a second node through a first interface. A node segment identifier (SID) is encapsulated at an outer layer of the packet, and the node SID identifies a destination node. The first node determines, based on the node SID, that an outbound interface for forwarding the packet is the first interface. The first node determines that a loop exists in a forwarding path of the packet.

Based on the foregoing technical solution, the first node determines, by determining whether an interface for receiving the packet is consistent with an outbound interface for forwarding the packet, whether a loop exists between the first node and a previous-hop node. For example, if the two interfaces are consistent, it is determined that the loop exists, so that a forwarding operation on the packet can be adjusted in a timely manner, thereby avoiding problems such as port congestion and service packet loss.

With reference to the first aspect, in an embodiment of the first aspect, the first node may forward the packet based on SR-BE, or may forward the packet based on SR Internet Protocol (IP) version 6 (IPv6) (SRv6 for short) BE. In addition, when the packet is forwarded in the two cases, the node SIDs encapsulated at the outer layer of the packet are different.

That the node SID is encapsulated at the outer layer of the packet has the following two possible cases.

In an embodiment, the first node forwards the packet based on conventional SR-BE, and the node SID corresponds to a multiprotocol label switching (multiprotocol label switching, MPLS) label.

For example, the node SID that is encapsulated at the outer layer of the packet refers to a label that corresponds to the node SID and that is determined based on a sum of the node SID and a starting address of a segment routing global block (segment routing global block, SRGB). For example, an outgoing label carried when the first node forwards the packet is a sum of a starting address of an SRGB of a next-hop node and a node SID of the destination node.

In another embodiment, the first node forwards the packet based on SRv6 BE, and the node SID corresponds to an SRv6 SID. Specifically, the node SID that is encapsulated at the outer layer of the packet refers to an SRv6 SID encapsulated based on the destination address.

With reference to the first aspect, in an embodiment of the first aspect, the method further includes: The first node determines, based on the node SID carried in the incoming label that is encapsulated in the packet, that a node SID carried in the outgoing label is the same as a node SID carried in an incoming label; and the first node determines that the loop exists in the forwarding path of the packet.

The first node determines that the interface for receiving the packet is consistent with the outbound interface for forwarding the packet, and the node SID carried in the outgoing label is the same as the node SID carried in the incoming label, to determine that a loop exists between the first node and the second node. This can effectively avoid misjudging the existence of the loop in the forwarding path of the packet in a case of SR-TE. It may be understood that, if SR-BE is fully deployed in a network, whether the loop exists between the first node and the previous-hop node may be determined by determining whether the interface for receiving the packet is consistent with the outbound interface for forwarding the packet. If SRv6 BE is fully deployed in the network, in other words, only a node SID of the destination address is encapsulated at the outer layer of the packet, whether the loop exists between the first node and the previous-hop node may be determined by determining whether the interface for receiving the packet is consistent with the outbound interface for forwarding the packet. If an SR-TE tunnel is deployed in the network, and a type of a label stack in the SR-TE tunnel is in a form of a hybrid label stack formed by the node SID and an adjacency SID, in other words, the label stack of the node SID and the adjacency SID is encapsulated at the outer layer of the packet, the first node further needs to determine, based on the node SID carried in the incoming label, whether the node SID carried in the outgoing label is the same as the node SID carried in the incoming label. This avoids misjudging the existence of the loop in the path when SR-TE forwards the packet based on the hybrid label stack formed by the node SID and the adjacency SID.

With reference to the first aspect, in an embodiment of the first aspect, the method further includes: The first node adjusts a packet forwarding operation, to avoid forwarding the packet to the second node through the first interface.

In an embodiment, the first node directly discards the packet when the loop exists in the forwarding path of the packet. When the loop exists in the forwarding path of the packet, the packet is directly discarded. This prevents port congestion and affects other services with a same priority.

In another embodiment, the first node forwards the packet by a backup path. Specifically, the first node forwards the packet to the next-hop node through a second interface, where a path from the first node to the destination node through the second interface is a backup path for forwarding the packet. The first node forwards the packet by the backup path, so that problems such as service packet loss and port congestion can be avoided.

According to a second aspect, this application provides a loop detection apparatus, to implement the method in the first aspect and any one of the embodiments of the first aspect. The apparatus includes a corresponding unit configured to perform the foregoing method. The unit included in the apparatus may be implemented by software and/or hardware.

According to a third aspect, this application provides a loop detection apparatus. The loop detection apparatus includes a processor. The processor is coupled to a memory, and may be configured to execute a computer program in the memory, to implement the loop detection method in the first aspect and any one of the embodiments of the first aspect.

Optionally, the apparatus further includes the memory.

Optionally, the apparatus further includes a communication interface, and the processor is coupled to the communication interface.

According to a fourth aspect, this application provides a computer-readable storage medium. The computer-readable storage medium stores a computer program or instructions, and when the computer program or the instructions is/are executed, the loop detection method in the first aspect and any one of the embodiments of the first aspect is implemented.

According to a fifth aspect, this application provides a computer program product. The computer program product includes a computer program, and when the computer program is run, the loop detection method in the first aspect and any one of the embodiments of the first aspect is implemented.

According to a sixth aspect, this application provides a chip system. The chip system includes a processor, and may further include a memory, configured to implement the loop detection method in the first aspect and any one of the embodiments of the first aspect. The chip system may include a chip, or may include a chip and another discrete device.

It should be understood that the second aspect to the sixth aspect of this application correspond to the technical solutions of the first aspect of this application, and beneficial effects achieved by the aspects and corresponding feasible implementations are similar. Details are not described again.

DESCRIPTION OF EMBODIMENTS

The following describes technical solutions of this application with reference to the accompanying drawings.

To clearly describe technical solutions in embodiments of this application, terms such as "first" and "second" are used in embodiments of this application to distinguish between same items or similar items that provide basically same functions or purposes. For example, a first node and a second node are used to distinguish between different network nodes, and a sequence of the first node and the second node is not limited. A person skilled in the art may understand that the terms such as "first" and "second" do not limit a quantity or an execution sequence, and the terms such as "first" and "second" do not indicate a definite difference.

In addition, terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

To better understand a loop detection method provided in embodiments of this application, the following first briefly describes terms used in this application.

1. SR: The SR is a technology for forwarding packets. The SR divides a network into one or more segments, allocates identifiers (IDs) to these segments and network nodes in the network, that is, SIDs, and arranges the SIDs in order, to be specific, arranges the segments and the network nodes in order, to obtain a forwarding path. The essence of the SR is similar to source routing. The SR is classified into two types: SR-TE and SR-BE. The method provided in embodiments of this application is applicable to both a conventional SR-BE technology and an SRv6 BE technology.

Figure 1:
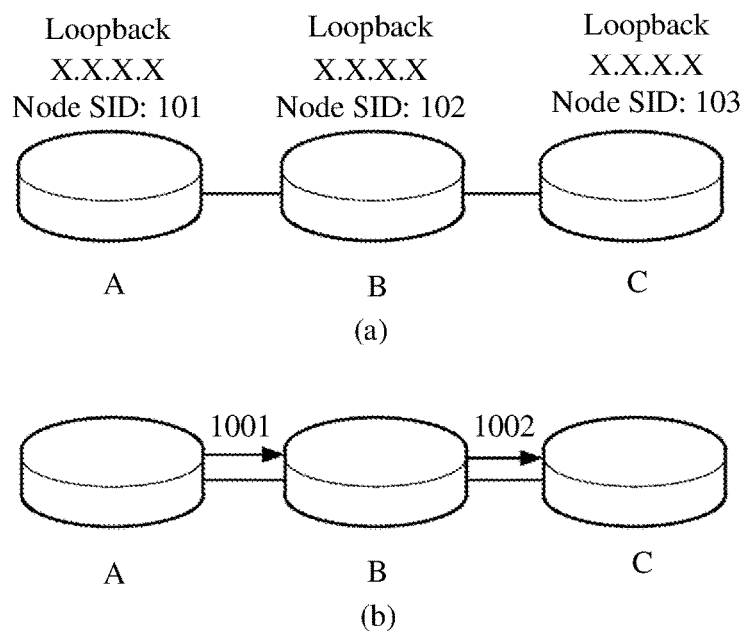
FIG. 1 is a schematic diagram of two types of SIDs according to an embodiment of this application.

2. SID: The SID is equivalent to an MPLS label in a conventional MPLS technology. In the SR-BE technology, the SID can be mapped to the MPLS label on a forwarding plane. SIDs are classified into two types: a node SID and an adjacency SID. FIG. 1 shows a schematic diagram of two types of SIDs.

(a) in FIG. 1 is an example of a node SID. The node SID is a special prefix SID, and identifies a specific network node. If an IP address is configured as a prefix on a loopback interface of the node, the node SID of the node is a prefix SID. In other words, the node SID may also be referred to as a prefix SID. For example, a node SID allocated to a node A is 101, a node SID allocated to a node B is 102, and a node SID allocated to a node C is 103. In other words, 101 may identify the node A, 102 may identify the node B, and 103 may identify the node C.

(b) in FIG. 1 is an example of an adjacency SID. The adjacency SID identifies an adjacency of a network node in the network and has a specific direction. For example, an adjacency SID from the node A to the node B is 1001, and an adjacency SID from the node B to the node C is 1002. In embodiments of this application, the node SID identifies a destination node.

3. Segment routing global block (SRGB): The SRGB is a user-specified range of MPLS labels reserved for SR. For example, an SRGB of a network node is [16000, 23999], where 16000 is a starting address of the SRGB.

4. SR-BE: According to an IGP, an optimal LSP is calculated through SPF. This is a tunneling technology. In the SR-BE technology, the node SID of the destination node is flooded to each node according to the IGP. Each node calculates a label value based on a local SRGB, and calculates a label forwarding path according to an intermediate system to intermediate system (IS-IS) routing protocol or an open shortest path first (OSPF) routing protocol to find a next-hop node, until a packet is forwarded to the destination node.

In the SR-BE technology, according to the IGP, a TI-LFA path that provides link and node protection for an SR-BE tunnel can also be calculated. The TI-LFA path may be also referred to as a backup path. When a link or node fails, traffic is quickly switched to the backup path, and packets are forwarded through the backup path.

Figure 2:
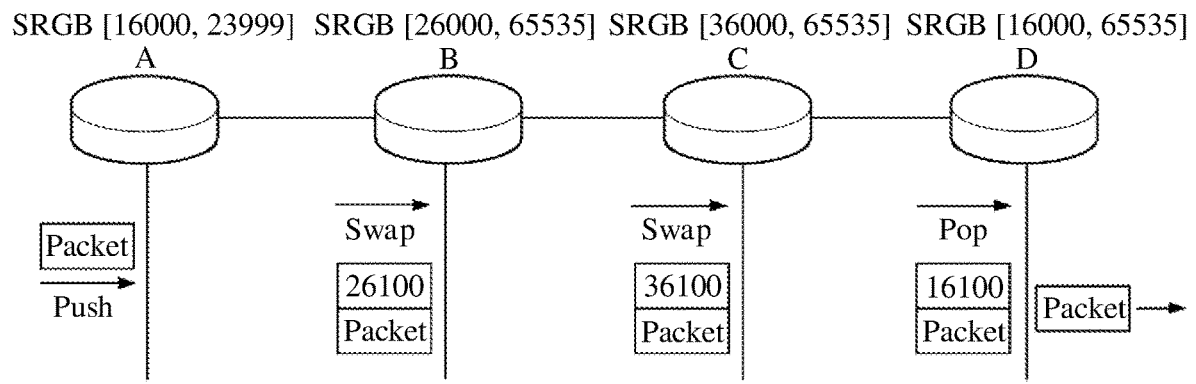
FIG. 2 is a schematic diagram of an SR-BE forwarding procedure according to an embodiment of this application.

FIG. 2 is an example of an SR-BE forwarding procedure according to an embodiment of this application. As shown in FIG. 2, a packet needs to be forwarded from a node A to a node D. After the packet is input from the node A, according to an IGP, a node SID=100 of a destination node (that is, the node D) is flooded to each network node. An SRGB of the node A is [16000, 23999], and an action is to push. The node A encapsulates a label 26100 at an outer layer of the packet. The label 26100 is a sum of a starting address of an SRGB of a next-hop node and the node SID. The node A sends the packet to the next-hop node (a node B). An SRGB of the node B is [26000, 65535] and the action is to swap. The node B receives the packet. In this case, a label that is encapsulated at the outer layer of the packet is 26100.

In embodiments of this application, to distinguish a label encapsulated when the packet enters the node B from a label encapsulated when the packet is output from the node B, the label encapsulated when the packet enters the node B is marked as an incoming label, that is, the incoming label is 26100, and the label encapsulated when the packet is output from the node B is marked as an outgoing label.

After receiving the packet, the node B determines, based on a label switching table, a label that needs to be encapsulated when the packet is sent to the next-hop node, that is, the outgoing label. It should be understood that the packet carries the outgoing label and enters the next-hop node, that is, the outgoing label is equivalent to the incoming label when the packet enters the next-hop node. The node B swaps the label that is encapsulated at the outer layer of the packet and replaces the incoming label 26100 with the outgoing label 36100. The label 36100 is a sum of the starting address of the SRGB of the next-hop and the node SID.

It may be understood that a forwarding process of a node C is similar to that of the node B, and details are not described herein again. After the packet reaches the destination node (the node D), the action is to pop. The label 16100 that is encapsulated at the outer layer of the packet is deleted, and the packet is forwarded based on an IP address.

5. SRv6: The SRv6 is an application of the SR technology on an IPv6 network plane. In the SRv6 technology, a packet of a segment routing header (SRH) is added to an IPv6 packet, to store an SRv6 SID list in a 128-bit (bit) IPv6 address format. An SRv6 SID can define path information, service information, and function information of a specific node. In the SRv6 BE technology, the SRv6 SID list includes only one SID. A destination address of an IPv6 packet header can be set to the SID, and the SRH does not need to be inserted. In other words, in the SRv6 BE technology, an IP address of the destination node is encapsulated in an outer SID of the packet.

The following briefly describes an application scenario applicable to the loop detection method provided in embodiments of this application.

In a possible scenario, SR-BE is fully deployed on a forwarding path of a packet. When a link fails or recovers, an MPLS label that is encapsulated at an outer layer of the packet triggers route convergence of network nodes, and each network node recalculates an LSP. Due to performance differences of control planes of the network nodes, a time for delivering the LSP to a forwarding plane is inconsistent, causing a loop between some network nodes. The following briefly describes a scenario in which a loop is formed when a link fails and when the link recovers in the SR-BE technology.

Figure 3:
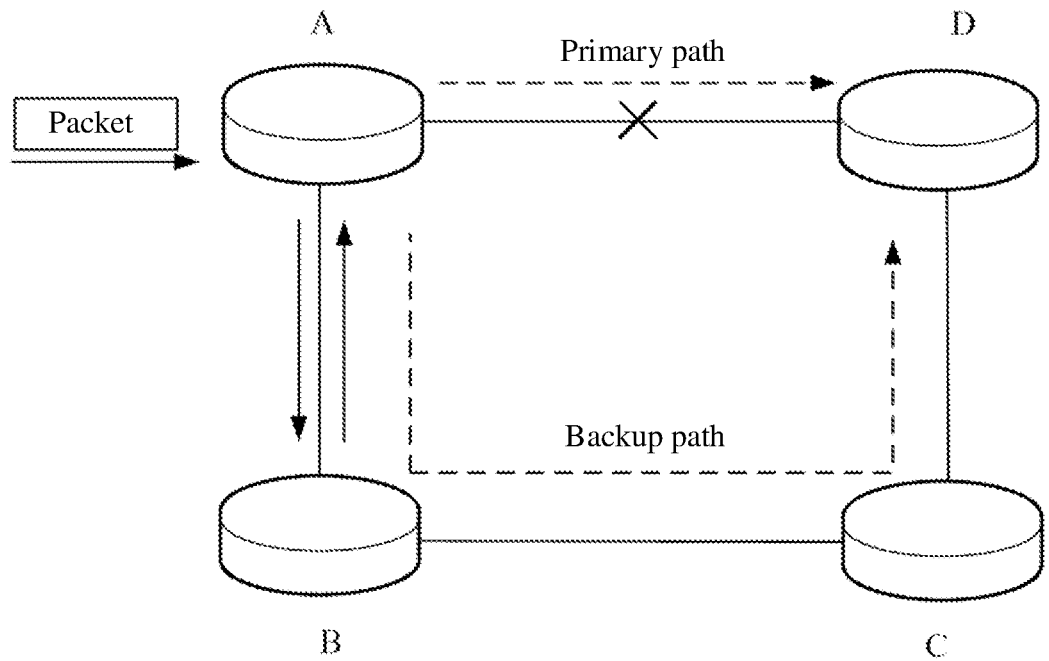
FIG. 3 is a schematic diagram of an application scenario applicable to a method according to an embodiment of this application.

With reference to FIG. 3, the following describes a scenario in which a loop is formed when an SR-BE link fails.

As shown in FIG. 3, a packet is forwarded from a node A to a node D. An IS-IS protocol is deployed on each network element. After SR is enabled, an optimal SR-BE LSP (a primary path) from the node A to the node D is A→D, and a backup path from the node A to the node D is A→B→C→D. The packet is input from the node A. When a link between the node A and the node D is normal, the packet is forwarded along the primary path A→D. When the link between the node A and the node D fails, traffic on the node A is rapidly switched to the backup path A→B→C→D. In this case, no loop is formed. Subsequently, the routes of the nodes are converged, but a convergence speed of the route of the node A is faster than that of the node B. That is, when the route of the node A is converged, the route of the node B may not be converged yet.

For example, convergence of the route of the node A is completed, and a path delivered to the forwarding plane after convergence is A→B→C→D. A next-hop node of the node A is updated to the node B, but convergence of the route of the node B may not be completed. In other words, a forwarding plane of the node B does not receive a newly calculated LSP. Assume that an SR-BE LSP from the node B to the node D is B→A→D. It can be learned that traffic in the opposite direction is generated on the node B, and a loop is formed between the node A and the node B. After route convergence on the node B is completed, the converged SR-BE LSP is B→C→D. The loop disappears.

Figure 4:
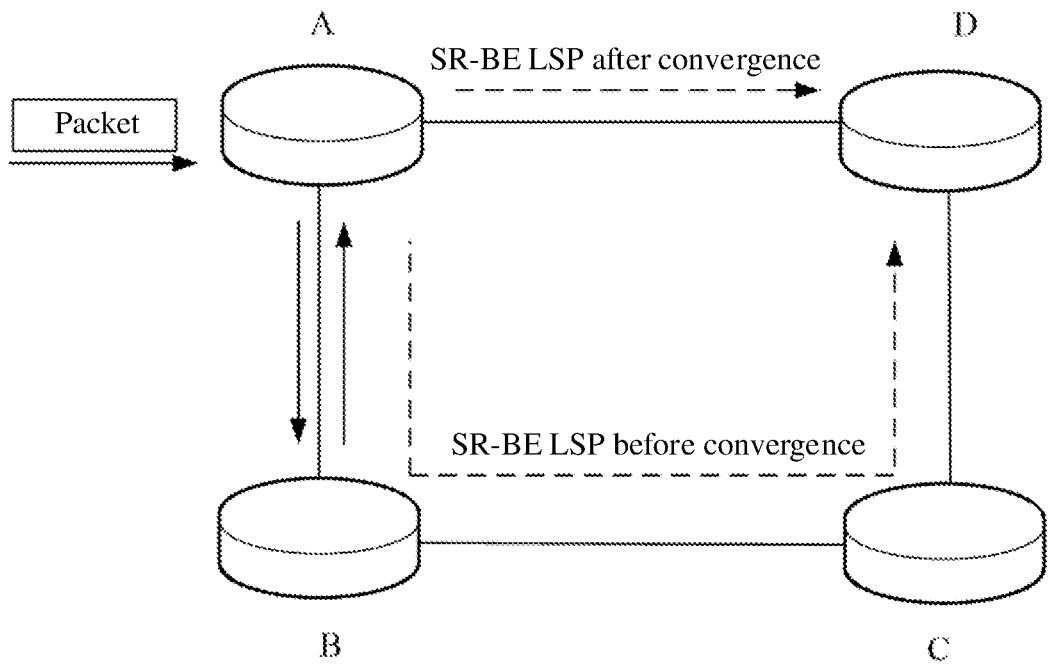
FIG. 4 is a schematic diagram of another application scenario applicable to a method according to an embodiment of this application.

With reference to FIG. 4, the following describes a scenario in which a loop is formed when an SR-BE link recovers.

As shown in FIG. 4, before a link between a node A and a node D recovers, an SR-BE LSP from the node A to the node D is A→B→C→D, and an SR-BE LSP from a node B to the node D is B→C→D. When the link between the node A and the node D recovers, route convergence occurs on each network node. A route convergence speed of the node B may be faster than that of the node A.

For example, a route of the node B is converged, and a path delivered to a forwarding plane after convergence is B→A→D. A next-hop node of the node B is updated to the node A. However, the node A may not complete convergence, and a path from the node A to the node D is still A→B→C→D. In this case, a loop is formed between the node A and the node B. After a route of the node A is converged, a primary path after convergence is A→D, and a backup path is A→B→C→D. A packet is forwarded from the node A to the node D through the primary path A→D, and the loop disappears.

It should be understood that the scenarios described in FIG. 3 and FIG. 4 are merely examples. In some other embodiments, there may be more or fewer network nodes or another label switched path on a forwarding path of the packet. This is not limited in embodiments of this application.

Figure 5:
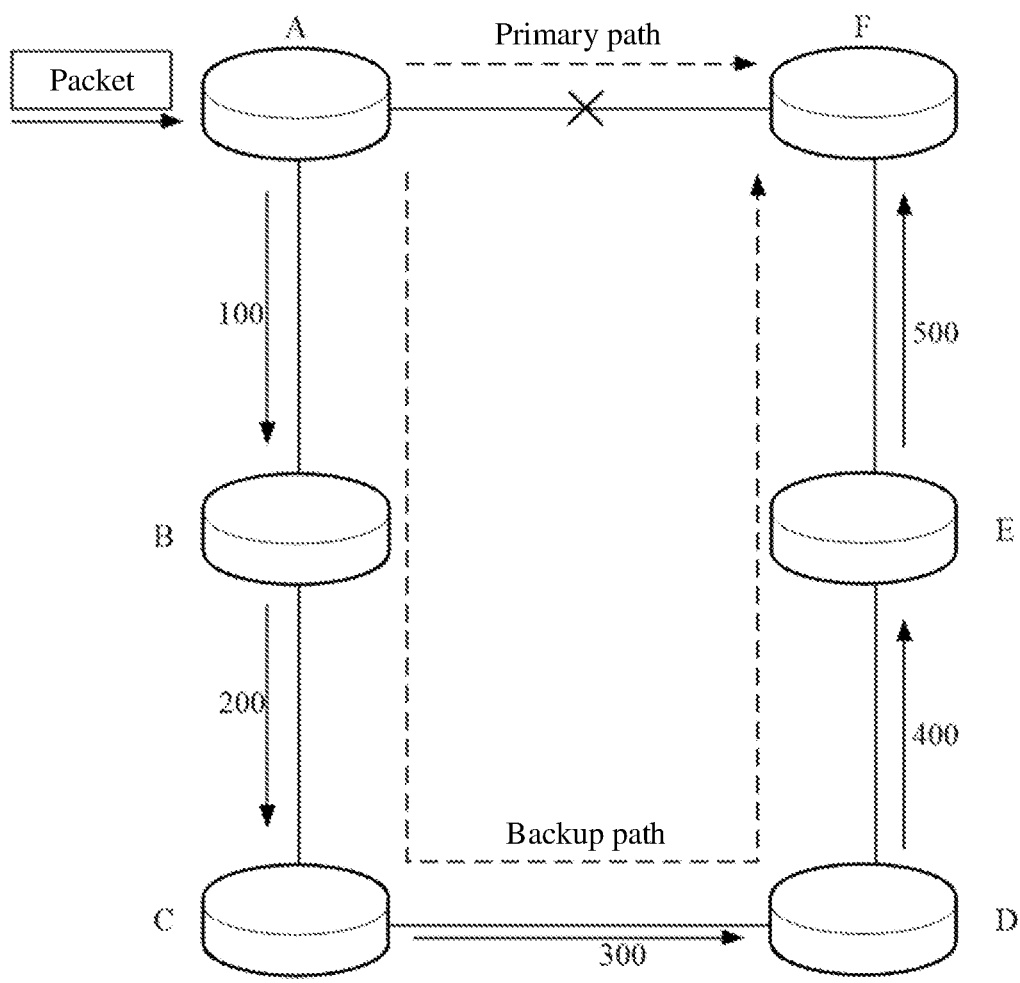
FIG. 5 is a schematic diagram of still another application scenario applicable to a method according to an embodiment of this application.

In another possible scenario, SR-TE is deployed on the forwarding path of the packet, and a hybrid label stack formed by a node SID and an adjacency SID is encapsulated outside the packet. In other words, some packets are forwarded based on the node SID and some packets are forwarded based on the adjacency SID on the entire forwarding path. There are two types of SR-TE LSP forwarding label stacks: One is a label stack formed by adjacency SIDs, and the other is a hybrid label stack formed by a node SID and an adjacency SID. As shown in FIG. 5, a packet is forwarded from a node A to a node F. A hybrid label stack formed by a node SID and an adjacency SID is encapsulated at an outer layer of the packet. If a link fails, the packet is forwarded along a backup path. Then, a route of each node is converged. For example, a node B calculates a label switched path for the packet from the node A to the node B based on the node SID. After route convergence is completed, the node A delivers the packet to a forwarding plane along a path A→B→C→D→E→F, that is, a next-hop node is the node B, but route convergence of the node B is not completed. In this case, the packet is forwarded along an original path B→A→F, and a loop is formed between the node A and the node B.

It may be understood that, in the SR-BE technology, when a link fails or recovers, because performance of devices of different network nodes is different, or a control plane of a network node is busy, convergence speeds are inconsistent. In other words, a time for delivering a newly calculated LSP to the forwarding plane is inconsistent, which causes a temporary loop. The loop may affect service transmission, for example, cause service packet loss and port congestion, and further affect other services with a same priority. Therefore, it is important to determine whether a loop exists between the nodes.

Based on this, this application provides a loop detection method. It is determined, depending on whether an interface through which the first node receives a packet is consistent with an outbound interface through which the first node forwards the packet, whether a loop exists between a first node and a previous-hop node. For example, if the two interfaces are consistent, it is determined that the loop exists, so that a forwarding operation on the packet can be adjusted in a timely manner, thereby avoiding problems such as port congestion and service packet loss.

Figure 6:
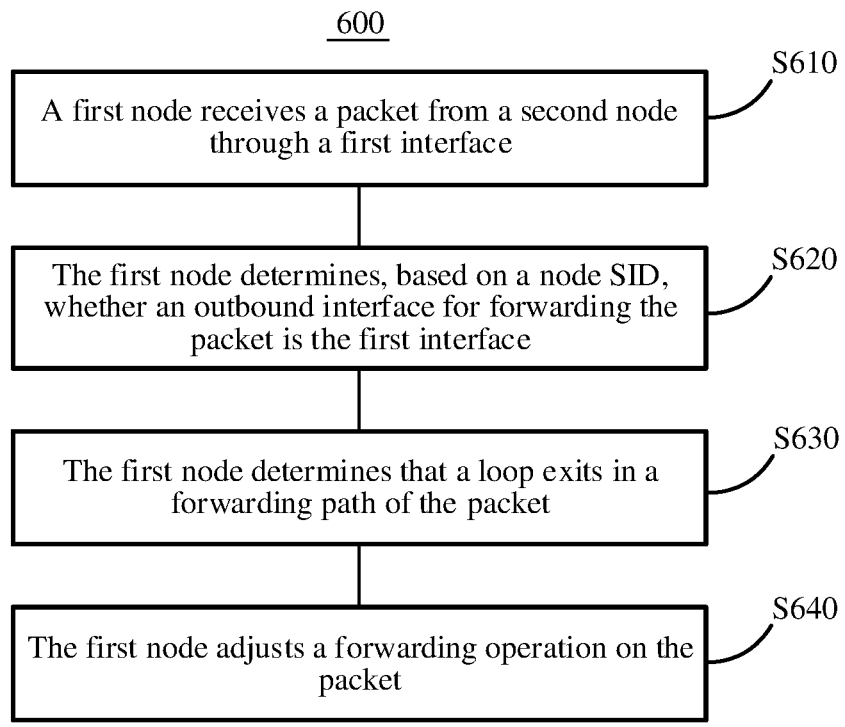
FIG. 6 is a schematic flowchart of a loop detection method according to an embodiment of this application.

FIG. 6 is a schematic flowchart of a loop detection method 600 according to an embodiment of this application. The method 600 shown in FIG. 6 may include S610 to S640. The following describes in detail steps in the method 600.

It should be understood that the method shown in FIG. 6 is described by using a first node as an execution entity. The first node may be an intermediate node. For an LSP path, both ends of the first node may be connected to adjacent network nodes using an Ethernet interface. In this embodiment of this application, a previous-hop node of the first node is denoted as a second node, and the second node may be an intermediate node or an edge node. This is not limited in this embodiment of this application. One end of the edge node is connected to the adjacent network node using the Ethernet interface, and the other end is connected to user equipment using a user interface.

S610: The first node receives a packet from the second node through a first interface.

A node SID is encapsulated at an outer layer of the packet, and the node SID identifies a destination node. The second node is a previous-hop node of the first node, and the first interface is an interface connecting the first node to the second node.

It should be understood that the destination node is a tail node of an SR-BE tunnel on a forwarding path of the packet. For example, when the SR-BE tunnel is fully deployed on the forwarding path of the packet, the destination node may be the tail node of the SR-BE tunnel, or may be referred to as the destination node of the packet. When an SR-TE tunnel including a hybrid label stack formed by a node SID and an adjacency SID is deployed on the forwarding path of the packet, in other words, some packets are forwarded based on the node SID, and some packets are forwarded based on the adjacency SID, the destination node is a tail node of a path for forwarding the packet based on the node SID, and cannot be referred to as a destination node of the packet.

Optionally, the first node may forward the packet based on conventional SR-BE, or may forward the packet based on SRv6 BE.

When the first node forwards the packet based on the conventional SR-BE, the node SID corresponds to an MPLS label, and a node SID label is encapsulated at an outer label of the packet. For example, the node SID that is encapsulated at the outer layer of the packet refers to a label (for example, the incoming label and the outgoing label described above) that corresponds to the node SID and that is determined based on a sum of the node SID and a starting address of an SRGB. For example, an outgoing label carried when the first node forwards the packet is a sum of a starting address of an SRGB of a next-hop node and a node SID of the destination node.

When the first node forwards the packet based on SRv6 BE, the node SID corresponds to an SRv6 SID. As described above, in the SRv6 BE technology, a destination address of an IPv6 header may be set to an SID, and the node SID that is encapsulated at the outer layer of the packet is an SRv6 SID that is encapsulated based on the destination address.

It should be noted that two cases in which the second node sends the packet to the first node are as follows.

In an embodiment, the second node senses that a primary path for forwarding the packet is faulty. For example, if the second node senses that an interface through which the second node is connected to a next-hop node on the primary path for forwarding the packet breaks down, the second node determines that a link of the primary path is faulty, and the second node forwards the packet along a backup path. A next-hop node on the backup path is the first node, that is, the second node sends the packet to the first node. Correspondingly, the first node receives the packet from the second node through the first interface.

In another embodiment, the second node senses that a link of the primary path for forwarding the packet recovers from a fault. For example, the second node may determine, by determining whether the interface recovers, whether a link fault is recovered. When the link fault occurs, a next-hop node of the second node is the first node. When the link fault is recovered, and a forwarding plane of the second node does not receive a new LSP, the second node still forwards the foregoing packet based on a path planned when the link fault occurs. That is, the second node sends the packet to the first node. Correspondingly, the first node receives the packet from the second node through the first interface.

It should be understood that, the first node can sense only a link fault of an adjacent node. As shown in FIG. 3, when a link from the node A to the node D is faulty, the second node (for example, the node A) can sense the link fault, and switch to the backup path for forwarding the packet. However, the first node (for example, the node B) cannot sense the link fault from the node A to the node D. Therefore, the node B cannot automatically switch to the backup path for forwarding the packet like the node A.

In conclusion, in the foregoing two cases, the second node sends the packet to the first node. Correspondingly, the first node receives the packet from the second node through the first interface, where the first interface is an interface through which the first node is connected to the second node.

S620: The first node determines, based on the node SID, whether an outbound interface for forwarding a packet is the first interface.

After receiving the packet, the first node may record an interface that receives the packet, that is, the first interface, and further determine the outbound interface for forwarding the packet, where the outbound interface is an interface through which the first node outputs the packet. It may be understood that, that the first node determines that the outbound interface for forwarding the packet is the first interface means that the first node determines that an interface for receiving the packet and an interface for sending the packet are a same interface, that is, a next-hop node of the first node is the second node. If the first node determines that the outbound interface for forwarding the packet is not the first interface, in other words, the first node determines that the interface for receiving the packet and the interface for sending the packet are not the same interface, no loop exists between the first node and the previous-hop node, and S630 and S640 do not need to be performed.

Figure 7:
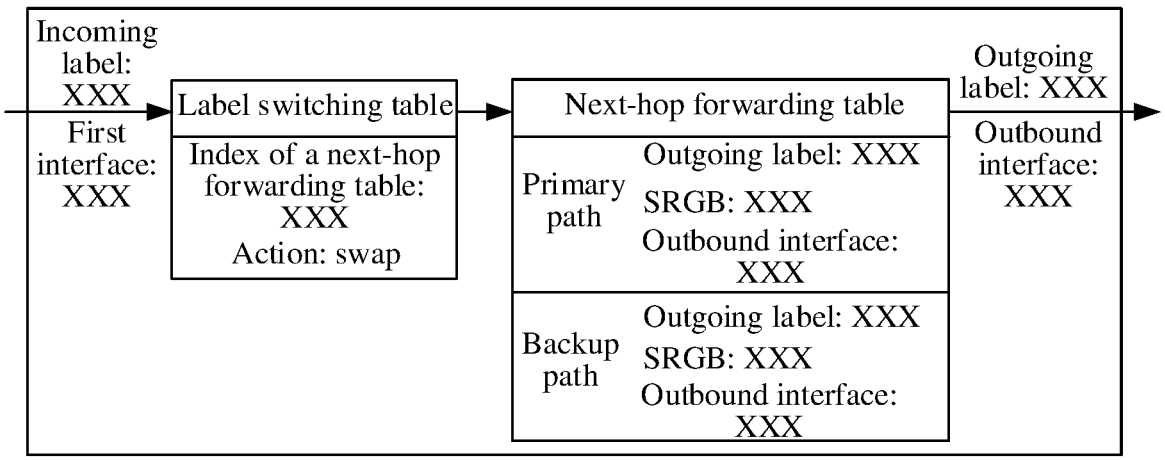
FIG. 7 is a schematic diagram in which a first node determines an outbound interface based on a node SID according to an embodiment of this application.

After receiving the packet, the first node determines, based on the node SID that is encapsulated at the outer layer of the packet, the outbound interface for forwarding the packet. As described above, there are two possible cases for the node SID that is encapsulated at the outer layer of the packet: The node SID corresponds to the MPLS label, or the node SID corresponds to the SRv6 SID. FIG. 7 is a schematic diagram in which a first node determines an outbound interface for forwarding the packet. With reference to FIG. 7, the following describes in detail a process in which the first node determines, based on the node SID when the node SID corresponds to the MPLS label, the outbound interface for forwarding the packet.

In an embodiment, the first node determines that the outbound interface is the first interface. As shown in FIG. 7, the first node receives a packet through the first interface, where an incoming label is encapsulated at an outer layer of the packet, and the incoming label carries a node SID of a destination node. The first node queries a label switching table based on the incoming label, determines an index of a next-hop forwarding table based on the label switching table, and queries the next-hop forwarding table based on the index. The next-hop forwarding table includes related information of next-hop nodes on a primary path and a backup path, such as an outgoing label, an SRGB of the next-hop node, and an outbound interface. In this case, the first node may determine, based on the next-hop forwarding table, that an outbound interface of the primary path for forwarding a packet is the first interface.

In an optional step, the first node determines, based on the node SID carried in the incoming label that is encapsulated in the packet, that a node SID carried in the outgoing label is the same as the node SID carried in the incoming label.

It should be understood that the node SID corresponds to the MPLS label, that is, a label determined by the first node based on the sum of the node SID and the starting address of the SRGB is encapsulated at the outer layer of the packet. It can be learned from the foregoing that there are two possible scenarios: The SR-BE tunnel is fully deployed in a network, and the SR-TE tunnel based on the hybrid label stack formed by the node SID and the adjacency SID is deployed in the network. Therefore, when the SR-TE tunnel based on the hybrid label stack formed by the node SID and the adjacency SID is deployed in the network, the node SID and the adjacency SID are encapsulated at the outer layer of the packet, and the first node further needs to determine, based on the node SID carried in the incoming label, that the node SID carried in the outgoing label is the same as the node SID carried in the incoming label, to avoid misjudging of existence of a loop on the path when the SR-TE tunnel performs forwarding based on an adjacency label.

In another embodiment, the first node determines that the node SID carried in the outgoing label is the same as the node SID carried in the incoming label, and that the outbound interface is the first interface. As shown in FIG. 7, the first node receives a packet through the first interface, where an incoming label is encapsulated at an outer layer of the packet, and the incoming label carries a node SID of a destination node. The first node calculates the node SID based on an incoming label in a packet header, that is, a difference value between the incoming label and a local SRGB is the node SID carried in the incoming label. Further, the first node queries a label switching table based on the incoming label to obtain an index of a next-hop forwarding table, queries the next-hop forwarding table based on the index of the next-hop forwarding table, and determines, based on an outgoing label on the primary path in the next-hop forwarding table, the node SID carried in the outgoing label, that is, a difference value between the outgoing label and the SRGB. The first node may learn that the node SID carried in the outgoing label is the same as the node SID carried in the incoming label, and the outbound interface is the first interface.

It should be noted that, in some embodiments, information about the next-hop forwarding table may be carried in the label switching table. In other words, the label switching table does not need to store the index of the next-hop forwarding table, and directly stores related information of the next-hop node.

It should be further understood that, in the foregoing embodiment, the next-hop forwarding table stores related information of the primary path and the backup path. In some embodiments, the next-hop forwarding table only includes the related information of the primary path, that is, the related information of the backup path cannot be found.

The following describes a process in which the first node determines, based on the node SID when the node SID corresponds to the SRv6 SID, the outbound interface for forwarding the packet.

It should be noted that, in the SRv6 BE technology, the SID may be collectively referred to as a virtual private network (VPN) SID. In an IPv4 VPN scenario, the SID may be referred to as an "END.DT4 SID". In an IPv6 VPN scenario, the SID may be referred to as an "END.DT6 SID". In this embodiment of this application, that the node SID corresponds to the SRv6 SID may be understood as that a VPN SID is encapsulated at the outer layer of the packet based on the destination address. For ease of clearly describing this embodiment of this application, the SID in the SRv6 BE technology is referred to as the VPN SID below. It should be understood that the SRv6 SID described above may be understood as an SID in the SRv6 BE technology, and has a same meaning as the VPN SID described herein.

The first node receives the packet from the first interface. That the node SID is encapsulated at the outer layer of the packet is a VPN SID encapsulated based on the destination address. In other words, the outer layer of the packet is an IP address of the destination node. The first node first determines that the VPN SID is encapsulated at the outer layer of the packet, and then determines whether the interface for receiving the packet is consistent with the outbound interface for forwarding the packet. For example, the first node queries a routing and forwarding table based on the destination address, determines the index of the next-hop forwarding table based on the routing and forwarding table, finds the next-hop forwarding table based on the index, and determines, based on the next-hop forwarding table, that the outbound interface of the primary path for forwarding the packet is the first interface.

S630: The first node determines that a loop exists in the forwarding path of the packet.

In S620, the first node determines whether the outbound interface for forwarding the packet is the first interface. If the outbound interface for forwarding the packet is the first interface, S630 and S640 are performed. If the outbound interface for forwarding the packet is not the first interface, no loop exists in the forwarding path of the packet, and forwarding continues based on an original path.

There are at least the following two ways in which the first node determines that the loop exists in the forwarding path of the packet.

In an embodiment, after determining, based on the node SID, that the outbound interface for forwarding the packet is the first interface, the first node determines that the loop exists in the forwarding path of the packet, that is, a loop exists between the first node and the second node.

In another embodiment, after determining, based on the node SID, that the outbound interface for forwarding the packet is the first interface and that the node SID carried in the incoming label and encapsulated in the packet is the same as the node SID carried in the outgoing label, the first node determines that the loop exists in the forwarding path of the packet, that is, a loop exists between the first node and the second node.

S640: The first node adjusts a forwarding operation on the packet.

After determining that the loop exists in the forwarding path of the packet, the first node may adjust the forwarding operation on the packet in the following two manners, to prevent the first node from forwarding the packet to the second node through the first interface.

In an embodiment, the first node directly discards the packet, to avoid port congestion and further affect a service of another priority. When a forwarding plane of the first node receives a new LSP, the packet is forwarded along the new path.

In another embodiment, the first node forwards the packet through the backup path. After determining that the loop exists in the forwarding path of the packet, the first node may forward the packet through the backup path that is for forwarding the packet and that is stored in the next-hop forwarding table. The first node determines, based on the backup path for forwarding the packet, a second interface connected to the next-hop node, and forwards the packet to the destination node through the second interface. A path from the first node to the destination node through the second interface is the backup path for forwarding the packet. That is, when the backup path can be queried from the next-hop forwarding table, the first node forwards the packet through the backup path. When the forwarding plane of the first node receives the new LSP, the packet is forwarded along the new path.

It may be understood that the foregoing two implementations are merely two examples of adjusting the forwarding operation on the packet. In some embodiments, the first node may determine, based on the next-hop forwarding table, whether the backup path exists, and then further select how to process the packet. For example, after determining that the loop exists in the forwarding path of the packet, the first node further determines whether the backup path for forwarding the packet can be found in the next-hop forwarding table. If the first node finds the backup path for forwarding the packet, the first node forwards the packet through the backup path; or if the first node does not find the backup path for forwarding the packet, the first node discards the packet, to avoid port congestion and avoid impact on the service of another priority.

Figure 8:
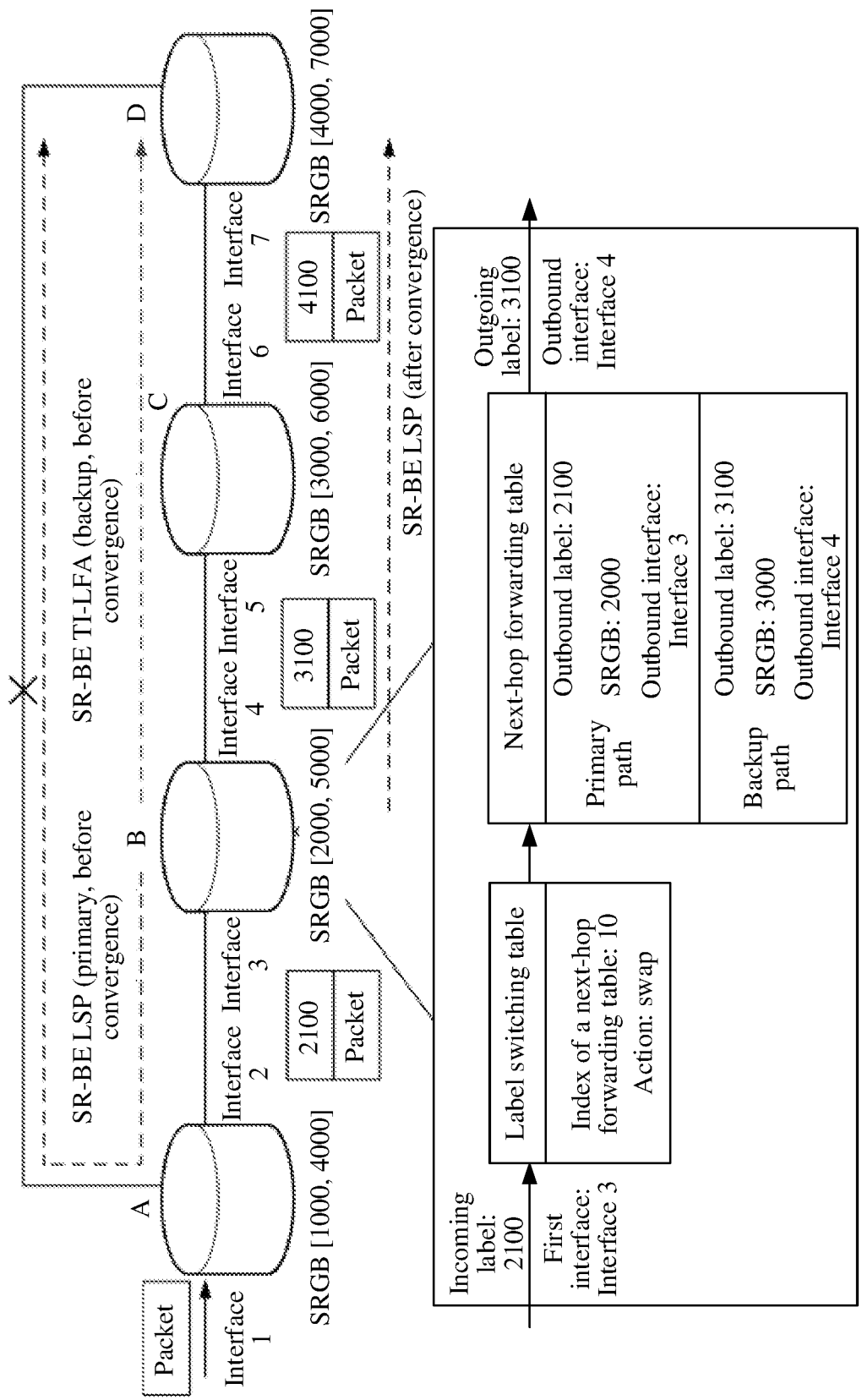
FIG. 8 is a schematic diagram in which a first node forwards a packet according to an embodiment of this application.

FIG. 8 is an example in which a first node forwards a packet. It should be noted that, FIG. 8 is a detailed process in which the first node forwards the packet when a link from a node A to a node D is faulty when the packet is forwarded based on SR-BE.

As shown in FIG. 8, an example in which the node A is used as a second node and a node B is used as the first node is used for description. A local SRGB range of the node A is [1000, 4000], a local SRGB range of the node B is [2000, 5000], and a destination node is the node D. That is, a tail node that is deployed in an SR-BE tunnel is the node D. The node A senses that the link from the node A to the node D is faulty, and switches to a backup path A→B→C→D for forwarding packets. Then, route convergence occurs on each node. A convergence speed of the node A is faster than that of the node B. That is, the node A has delivered a calculated new LSP to a forwarding plane, that is, A→B→C→D. For the node B, a primary path before convergence is B→A→D, and a backup path is B→C→D. The node B has not delivered a new SR-BE LSP to the forwarding plane.

The node B receives a packet from the node A through an interface 3 (that is, a first interface); queries a label switching table based on an incoming label 2100 encapsulated at an outer layer of the packet, where an index of a next-hop forwarding table in the label switching table is 10; and queries the next-hop forwarding table based on the index 10. In the next-hop forwarding table, when the packet is forwarded along the primary path, an outgoing label is 2100, an SRGB is 2000, and an outbound interface is the interface 3. It can be seen that a node SID carried in the outgoing label is 2100−2000=100, a node SID carried in the incoming label is 2100−2000=100, and the interface 3 is the first interface. Therefore, a loop exists between the node A and the node B.

It can be learned from the next-hop forwarding table in the figure that the next-hop forwarding table stores related information of the backup path, the node B may forward the packet through an interface 4 (that is, a second interface), and a next-hop node is a node C. For the node B, the packet is forwarded along the backup path until convergence of the node B is completed, and the new SR-BE LSP is delivered to the forwarding plane. It should be understood that the node B swaps the incoming label 2100 encapsulated in the packet with an outgoing label 3100, and the outgoing label encapsulated when the node B forwards the packet through the interface 4 is 3100.

After the convergence is completed, the new SR-BE LSP is delivered to the forwarding plane for the node B. The new SR-BE LSP is B→C→D, and the packet is forwarded along the path B→C→D.

It should be understood that, for the node C, whether a loop exists between the node C and the node B may also be determined by the foregoing method. For brevity, details are not described herein again.

Figure 9:
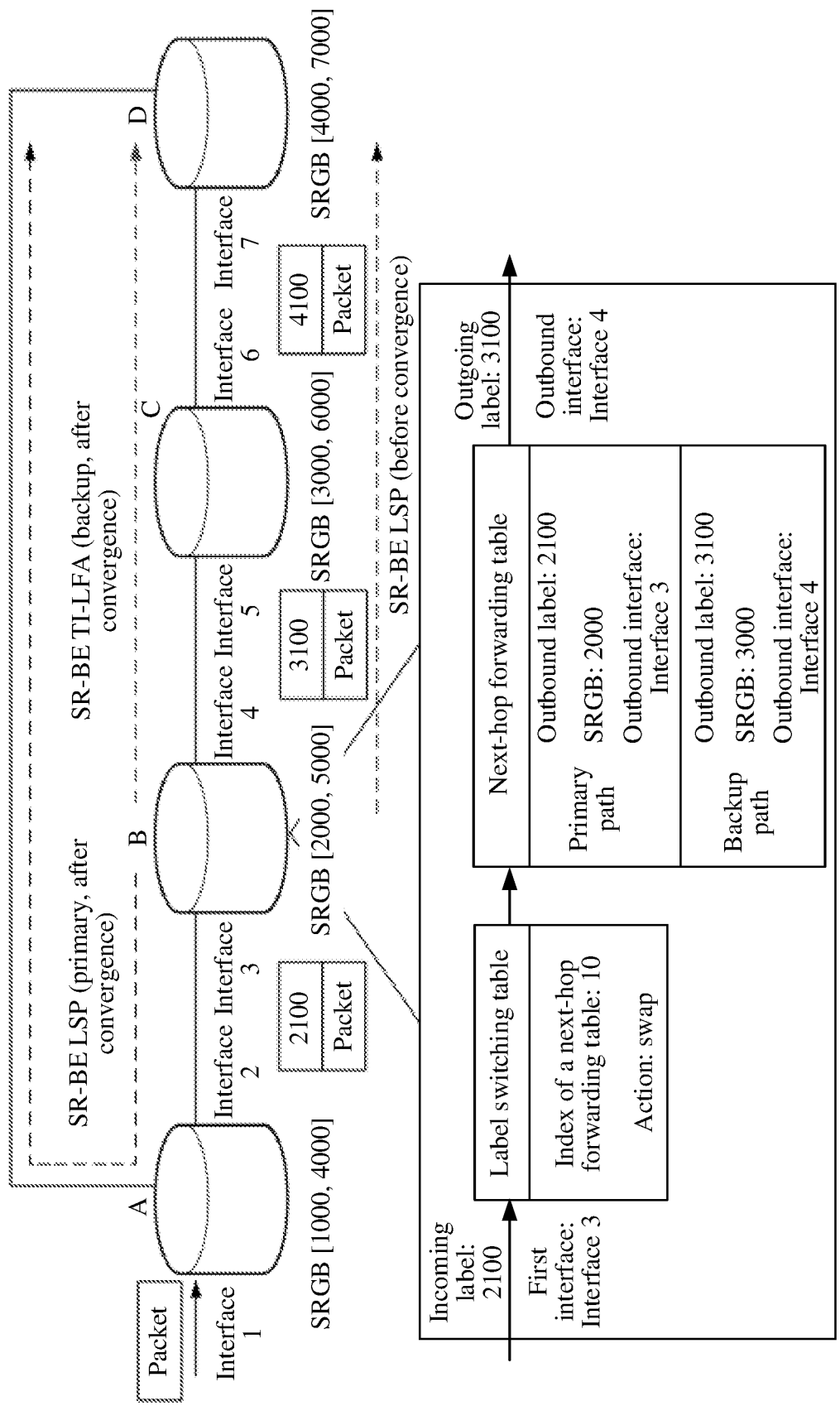
FIG. 9 is another schematic diagram in which a first node forwards a packet according to an embodiment of this application.

FIG. 9 is another example in which a first node forwards a packet. It should be noted that, FIG. 9 is a detailed process in which the first node forwards the packet when a link from a node A to a node D recovers from a fault when the packet is forwarded based on SR-BE.

As shown in FIG. 9, an example in which the node A is used as a second node and a node B is used as the first node is used for description. A local SRGB range of the node A is [1000, 4000], a local SRGB range of the node B is [2000, 5000], and a destination node is the node D. After sensing that the link from the node A to the node D recovers from the fault, the node A performs route convergence on each network node. Assume that a convergence speed of the node A is slower than that of the node B. In other words, the node B has delivered a calculated new SR-BE LSP to a forwarding plane. That is, a primary path is B→A→D, a backup path is B→C→D, and a path from the node B to the node D is B→C→D before convergence. For the node A, an SR-BE LSP before convergence is A→B→C→D. If the node A has not completed convergence, that is, the node A does not deliver the new SR-BE LSP to the forwarding plane, the node A continues to send the packet to the node B.

The node B has completed convergence and its forwarding plane receives the new SR-BE LSP. The node B receives a packet from the node A through an interface 3 (that is, a first interface); queries a label switching table based on an incoming label 2100 encapsulated at an outer layer of the packet, where an index of a next-hop forwarding table in the label switching table is 10; and queries the next-hop forwarding table based on the index 10. In the next-hop forwarding table, when the packet is forwarded along the primary path, an outgoing label is 2100, an SRGB is 2000, and an outbound interface is the interface 3. It can be seen that a node SID carried in the outgoing label is 2100−2000=100, a node SID carried in the incoming label is 2100−2000=100, and the interface 3 is the first interface. Therefore, a loop exists between the node A and the node B.

It can be learned from the next-hop forwarding table in the figure that the next-hop forwarding table stores related information of the backup path, the node B may forward the packet through an interface 4 (that is, a second interface), and a next-hop node is a node C. For the node A, when a forwarding plane of the node A receives the new SR-BE LSP, the packet is forwarded along the new SR-BE LSP. It should be understood that the node B swaps the incoming label 2100 encapsulated in the packet with an outgoing label 3100, and the outgoing label encapsulated when the node B forwards the packet through the interface 4 is 3100.

Based on the foregoing technical solution, whether a loop exists in a forwarding path of the packet may be determined by determining whether an interface through which the first node receives the packet is consistent with an outbound interface through which the first node forwards the packet. When the loop exists in the forwarding path of the packet, the forwarding path of the packet is further adjusted, for example, the packet is forwarded along the backup path, or the packet is discarded, to destroy the loop in the forwarding path of the packet in a timely manner, to avoid problems such as port congestion and service packet loss.

Figure 10:
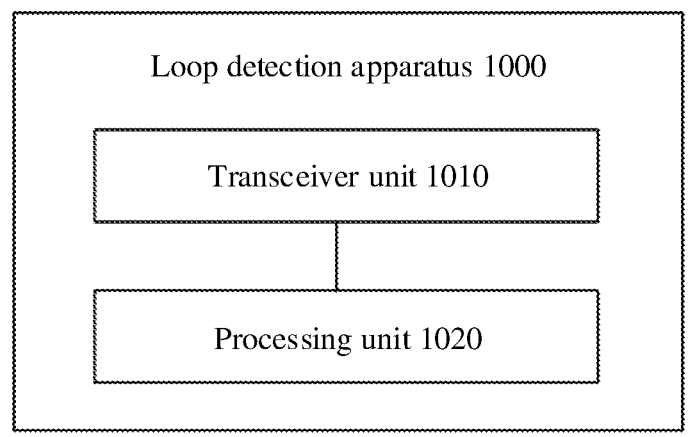
FIG. 10 is a schematic block diagram of a loop detection apparatus according to an embodiment of this application.
Figure 11:
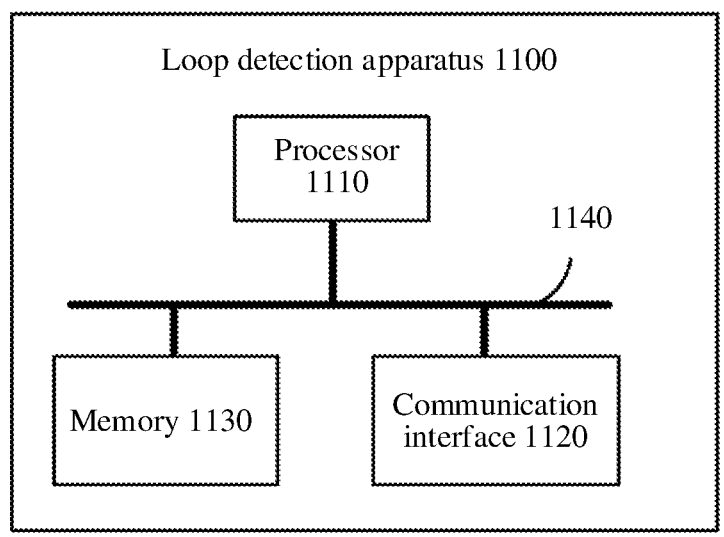
FIG. 11 is another schematic block diagram of a loop detection apparatus according to an embodiment of this application.

The following describes in detail a loop detection apparatus according to an embodiment of this application with reference to FIG. 10 and FIG. 11.

FIG. 10 is a schematic block diagram of a loop detection apparatus 1000 according to an embodiment of this application. As shown in FIG. 10, the apparatus 1000 may include a transceiver unit 1010 and a processing unit 1020. The units in the apparatus 1000 may be configured to implement a corresponding procedure performed by the first node in the method 600 shown in FIG. 6.

When the apparatus 1000 is configured to perform the steps performed by the first node in the foregoing method embodiment, the transceiver unit 1010 may be configured to receive a packet from a second node through a first interface, where a node SID is encapsulated at an outer layer of the packet, and the node SID identifies a destination node. The processing unit 1020 may be configured to determine, based on the node SID, that an outbound interface for forwarding the packet is the first interface, and may be further configured to determine that a loop exists in a forwarding path of the packet. For details, refer to the detailed description in the method embodiment, and details are not described herein again.

It should be further understood that a specific process in which the units perform the foregoing corresponding steps is described in detail in the foregoing method embodiments, and for brevity, details are not described herein.

It should be further understood that unit division in embodiments of this application is an example, and is merely logical function division. There may be another division manner in an actual implementation. In addition, functional units in embodiments of this application may be integrated into one processor, or each of the units may exist alone physically, or two or more units are integrated into one unit. The integrated unit may be implemented in a form of hardware, or may be implemented in a form of a software function unit.

FIG. 11 is another schematic block diagram of a loop detection apparatus 1100 according to an embodiment of this application. The apparatus 1100 may be a chip system, or may be an apparatus configured with the chip system, to implement a loop detection function in the foregoing method embodiment. In embodiments of this application, the chip system may be formed by chips, or may include chips and other discrete components.

As shown in FIG. 11, the apparatus 1100 may include a processor 1110 and a communication interface 1120. The communication interface 1120 may be configured to communicate with another device via a transmission medium, so that an apparatus in the apparatus 1100 may communicate with the another device. The communication interface 1120 may be, for example, a transceiver, an interface, a bus, a circuit, or an apparatus that can implement a sending and receiving function. The processor 1110 may input and output data through the communication interface 1120, and is configured to implement the loop detection method in the embodiment corresponding to FIG. 6. Specifically, the apparatus 1100 may be configured to implement a function of the first node in the foregoing method embodiment.

For example, if the apparatus 1100 is configured to implement the function of the first node in the method provided in embodiments of this application, the processor 1110 may be configured to control the communication interface 1120 to receive a packet from a second node, where a node SID is encapsulated at an outer layer of the packet, and the node SID identifies a destination node. The processor 1110 may be further configured to determine, based on the node SID, that an outbound interface for forwarding the packet is the first interface, and may be further configured to determine that a loop exists in a forwarding path of the packet. For details, refer to the detailed description in the method embodiment, and details are not described herein again.

Optionally, the apparatus 1100 further includes at least one memory 1130, configured to store program instructions and/or data. The memory 1130 is coupled to the processor 1110. The coupling in this embodiment of this application may be an indirect coupling or a communication connection between apparatuses, units, or modules in an electrical form, a mechanical form, or another form, and is used for information exchange between the apparatuses, the units, or the modules. The processor 1110 may operate cooperatively with the memory 1130. The processor 1110 may perform the program instructions stored in the memory 1130. At least one of the at least one memory may be included in the processor.

A specific connection medium between the processor 1110, the communication interface 1120, and the memory 1130 is not limited in embodiments of this application. In embodiments of this application, in FIG. 11, the processor 1110, the communication interface 1120, and the memory 1130 are connected via a bus 1140. The bus 1140 is represented by a thick line in FIG. 11. A connection manner between other components is merely an example for description, and is not limited thereto. The bus may be classified into an address bus, a data bus, a control bus, and the like. For ease of representation, only one bold line is used to represent the bus in FIG. 11, but this does not mean that there is only one bus or only one type of bus.

This application further provides a computer program product. The computer program product includes a computer program (which may also be referred to as code or instructions). When the computer program is run, a computer is enabled to perform the method in the embodiment shown in FIG. 6.

This application further provides a computer-readable storage medium. The computer-readable storage medium stores a computer program (which may also be referred to as code or instructions). When the computer program is run, a computer is enabled to perform the method in the embodiment shown in FIG. 6.

It should be understood that the processor in embodiments of this application may be an integrated circuit chip, and has a signal processing capability. In an implementation process, the steps in the foregoing method embodiments may be implemented by an integrated logic circuit of hardware in the processor, or by instructions in a form of software. The processor may be a general-purpose processor, a digital signal processor (DSP), an application specific integrated circuit (ASIC), a field programmable gate array (FPGA) or another programmable logic device, a discrete gate circuit or a transistor logic device, or a discrete hardware component. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly performed and accomplished through a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be further understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memories of the system and method described herein are intended to include, but are not limited to, these and any other suitable types of memories.

The terms "unit", "module", and the like used in this specification may be used to indicate a computer-related entity, hardware, firmware, a combination of hardware and software, software, or software being executed.

A person of ordinary skill in the art may be aware that, in combination with illustrative logical blocks (illustrative logical block) described in the embodiments disclosed in this specification and steps (step) may be implemented by electronic hardware or a combination of computer software and electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this application. In the several embodiments provided in this application, it should be understood that the disclosed apparatus, device, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as discrete parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in embodiments of this application may be integrated into one processing unit, or each of the units may exist alone physically, or two or more units are integrated into one unit.

In the foregoing embodiments, all or some functions of the functional units may be implemented by using software, hardware, firmware, or any combination thereof. When software is used to implement the embodiments, all or a part of the embodiments may be implemented in a form of a computer program product. The computer program product includes one or more computer instructions (programs). When the computer program instructions (programs) are loaded and executed on the computer, the procedures or functions according to embodiments of this application are all or partially generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

When the functions are implemented in the form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A loop detection method, comprising:
    receiving, by a first node, a packet from a second node through a first interface, wherein a node segment identifier (SID) is encapsulated at an outer layer of the packet, and the node SID identifies a destination node;
    determining, by the first node based on the node SID, that an outbound interface for forwarding the packet is the first interface;
    determining, by the first node based on a node SID carried in an incoming label encapsulated at the outer layer in the packet, that a node SID carried in an outgoing label is the same as the node SID carried in the incoming label, wherein the outgoing label carried when the first node forwards the packet is a sum of a starting address of a segment routing global block (SRGB) and the node SID of the destination node;
    determining, by the first node, that a loop exists in a forwarding path of the packet based on the outbound interface for forwarding the packet being the first interface; and
    avoiding, by the first node, forwarding the packet to the second node through the first interface by:
    forwarding, by the first node, the packet to the destination node through a second interface, wherein a path from the first node to the destination node through the second interface is a backup path for forwarding the packet, or
    discarding, by the first node, the packet.

2. The method according to claim 1, wherein the node SID corresponds to a multi-protocol label switching (MPLS) label.

3. The method according to claim 2, wherein the first node forwards the packet based on segment routing-best effort (SR-BE).

4. The method according to claim 1, wherein the node SID corresponds to a segment routing over Internet Protocol version 6 IPv6 segment identifier (SRv6 SID).

5. The method according to claim 4, wherein the first node forwards the packet based on segment-routing IPv6 best-effort (SRv6 BE).

6. A loop detection apparatus, comprising:
    a transceiver unit, configured to receive a packet from a second node through a first interface, wherein a node segment identifier (SID) is encapsulated at an outer layer of the packet, and the node SID identifies a destination node; and
    a processing unit, configured to determine, based on the node SID, that an outbound interface for forwarding the packet is the first interface, and determine based on a node SID carried in an incoming label encapsulated at the outer layer in the packet, that a node SID carried in an outgoing label is the same as the node SID carried in the incoming label, wherein the outgoing label carried when the first node forwards the packet is a sum of a starting address of a segment routing global block (SRGB) and the node SID of the destination node, wherein the processing unit is further configured to determine that a loop exists in a forwarding path of the packet based on the outbound interface for forwarding the packet being the first interface, and avoid forwarding the packet to the second node through the first interface by:

forwarding the packet to the destination node through a second interface, wherein a path to the destination node through the second interface is a backup path for forwarding the packet, or discarding the packet.

7. The apparatus according to claim 6, wherein the node SID corresponds to a multi-protocol label switching (MPLS) label.

8. The apparatus according to claim 7, wherein the processing unit is configured to forward the packet based on segment routing-best effort (SR-BE).

9. The apparatus according to claim 6, wherein the node SID corresponds to a segment routing over Internet Protocol version 6 IPv6 segment identifier (SRv6 SID).

10. The apparatus according to claim 9, wherein the processing unit is configured to forward the packet based on segment-routing IPv6 best-effort (SRv6 BE).

11. A loop detection apparatus, comprising:
a memory, storing instructions; and
a processor, wherein when the instructions are run by the processor, the detection apparatus is enabled to perform the method according to claim 1.

12. A non-transitory computer-readable storage medium, comprising a computer program, wherein when the computer program is run on a processor, the method according to claim 1 is performed.

* * * * *